July 21, 1936.  M. KLEIN  2,048,074
MERCHANDISE TICKET AUDITING MACHINE
Filed July 21, 1930  2 Sheets-Sheet 1

Inventor
Matthew Klein
by John Flam
Attorney

July 21, 1936.  M. KLEIN  2,048,074
MERCHANDISE TICKET AUDITING MACHINE
Filed July 21, 1930  2 Sheets-Sheet 2
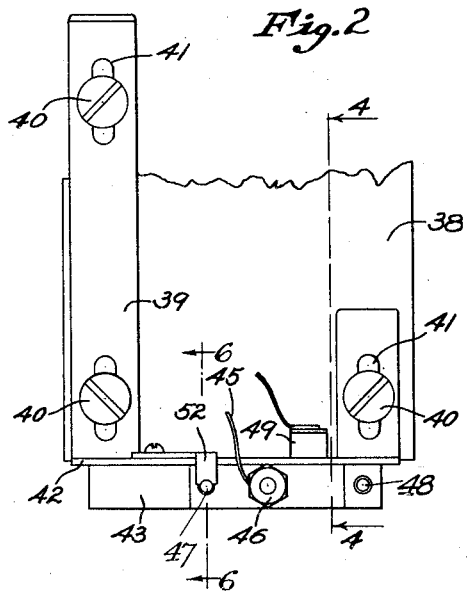
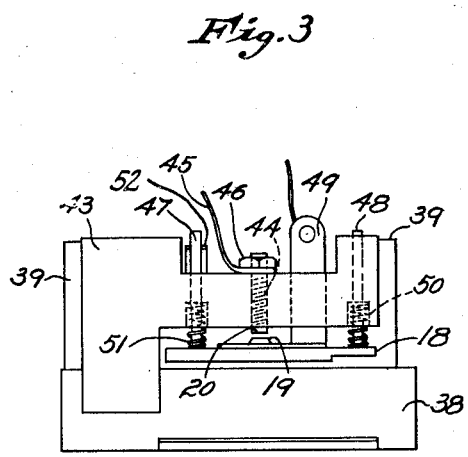
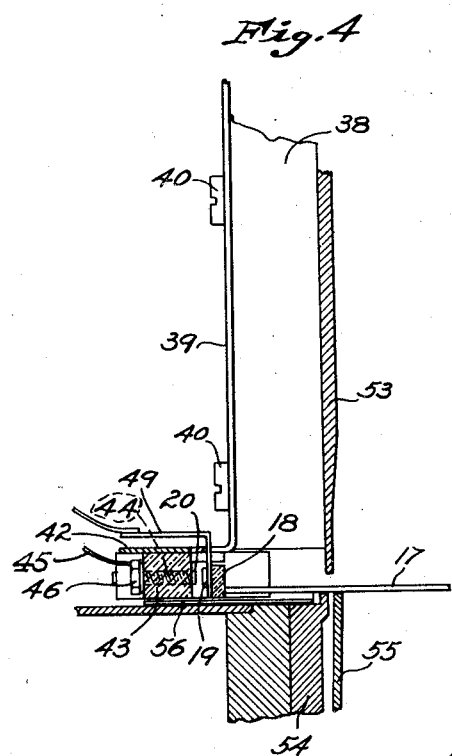
Inventor
Matthew Klein
by John Flam
Attorney Patented July 21, 1936

2,048,074

UNITED STATES PATENT OFFICE 2,048,074

MERCHANDISE TICKET AUDITING MACHINE

Matthew Klein, Billings, Mont., assignor of one-half to Hart-Albin Company, a corporation of Montana Application July 21, 1930, Serial No. 469,497

3 Claims. (Cl. 235—1)

This invention relates to a merchandise ticket auditing machine, and more particularly to the control of the operations to be performed by the machine.

This invention relates to the mechanism disclosed in my two prior patents granted June 25, 1929, and having Numbers 1,718,212 and 1,718,213.

In these prior patents there is disclosed an apparatus that makes and classifies true records of sales transactions of merchandise sold, as in department stores. Thus in the forms disclosed in these patents, the ticket that is attached or associated with the merchandise being sold is inserted into an appropriate opening in the casing of the machine; and the operation of the machine is initiated after a control button is pressed by the operator. The mechanism is then actuated to cut off a part of the ticket, and to attach this part to a backing, supplied as from a roll. On this backing can be printed supplemental data, such as the kind of sale, the clerk identification, or the like. After these supplemental data are added, the machine automatically deposits the complete record into a selected compartment. In the preferred form, one of a series of cash drawers opens automatically, in order to make it possible for the sales person to deposit the money taken in on the sale, and to make the change to the customer, in case the sale is a cash transaction.

In these prior forms, the machine can be caused to complete the cycle of operations without the insertion of a ticket, as by merely pressing the control in which case the paper tape to which the ticket would normally be attached is cut off and is deposited as an incomplete record. This indicates that the machine was operated without an accompanying transaction.

Although this is in some instances advantageous as forming a means for the detection of unauthorized operation of the machine, yet it is one of the objects of my machine so to arrange matters that the machine cannot be operated unless the price ticket is inserted within the machine.

It is another object of my invention to provide a device that compels the operator to cause the machine to record completely, all desired facts relating to the transaction.

In some instances, it is advisable to combine the ticket auditing machine with a cash register or totalizer machine. With the aid of my present invention, the operation of the cash register or such totalizer is prevented, unless a price ticket has been inserted into the machine.

The advantages of the use of a ticket auditing machine such as described in my prior patents have been disclosed therein, and involves mainly the certainty of securing accurate records of the sales transaction because a part of the ticket is incorporated on the record. There is thus no necessity of any independent writing or printing by the operator, the machine automatically making its own authorized record.

The ticket or price tag which is associated with, and usually attached to, merchandise offered for sale in department stores can carry complete information, such as the selling price, cost, manufacturer's file number, color, size, material, name of the article, department number, and manufacturer or the like. This record is authentically incorporated with the record collected by the machine, which can be used for statistical records and proper control. Furthermore, this record is obtained rapidly and without any delay, since no transcription of the sales data need be made by the salesperson.

It is another object of my invention to provide an electrical control system, whereby this recording operation is accomplished, but only in response to the insertion of a price ticket into an appropriate space in the machine.

My invention possesses many other advantages, and has other objects which may be made more easily apparent from a consideration of one embodiment of my invention. For this purpose I have shown a form in the drawings accompanying and forming part of the present specification. I shall now proceed to describe this form in detail, which illustrates the general principles of my invention; but it is to be understood that this detailed description is not to be taken in a limiting sense, since the scope of my invention is best defined by the appended claims.

Referring to the drawings:

Fig. 2 is a fragmentary elevation view showing a part of the mechanism associated with the ticket auditing machine;

Fig. 3 is a fragmentary bottom plan view of the parts shown in Fig. 2;

Fig. 4 is a sectional view taken along plane 4—4 of Fig. 2;

Figure 1:
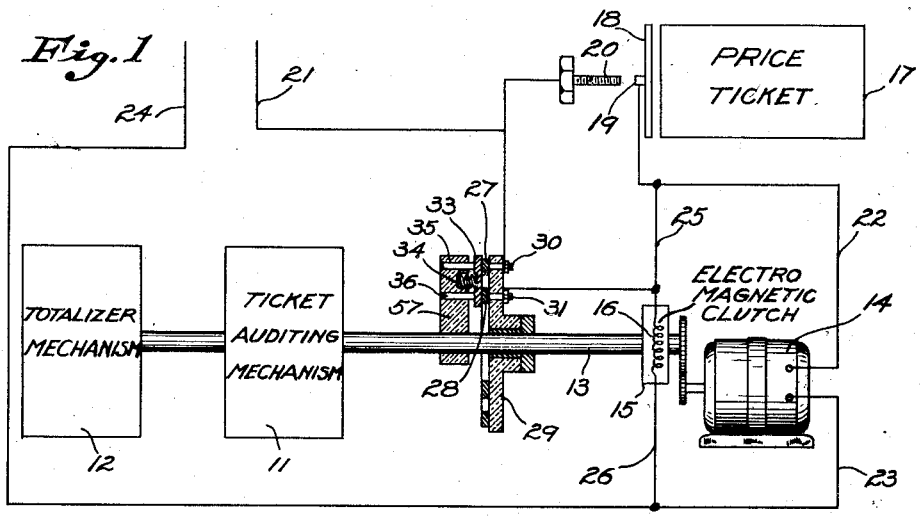
Figure 1 is a diagram of a complete system for controlling the operation of the ticket auditing machine and any associated mechanism, such as a totalizer.

In the present instance, it is considered unnecessary to detail the complete mechanism shown in my prior patents, and for that reason the ticket auditing mechanism, as well as an associated totalizer, are shown merely diagrammatically by the reference characters 11 and 12. In order to indicate a diagrammatic drive for these mechanisms, a shaft 13 is indicated, arranged to be driven in this instance by an electric motor 14. An electromagnetic clutching device 15 is shown interposed between the motor and the mechanisms 11 and 12, said clutch being electromagnetically controlled as by energization of a coil 16.

The price ticket is indicated diagrammatically by the oblong 17. The control arrangement is such that when the price ticket is urged against a member 18 inside of the machine, a connection is made between a contact 19 and another contact 20, since contact tip 19 is urged to engage the corresponding contact 20. When these contacts 19 and 20 are thus engaged, a circuit is completed both through the motor 14 and the clutch coil 16. This circuit can be traced as follows: lead 21, contact 20, contact 19, where the circuit divides; one part proceeding by way of connection 22, through the motor 14 and by way of connection 23 to the other main 24. The circuit for the clutch coil 16 is completed through a connection 25, coil 16, connection 26, back to main 24.

Figure 5:
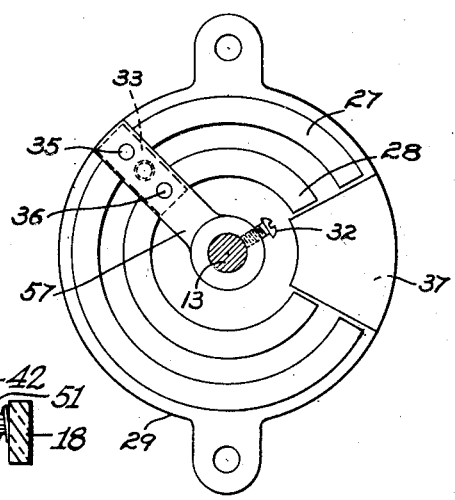
Fig. 5 is a front view of one of the switches incorporated in the system.
Figure 6:
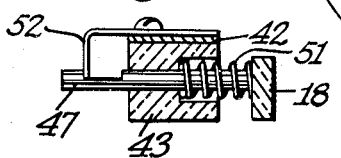
Fig. 6 is a detail section taken along plane 6—6 of Fig. 2.

Since the price ticket 17 is severed soon after the initiation of the operation of the device, and carried by the mechanism to an appropriate receptacle, the contacts 19 and 20 open even before the complete cycle of operation of mechanisms 11 and 12. In order to maintain the circuits closed through the motor 14 and the clutch coil 15 until a complete cycle of operation is performed, there is provided a main switch mechanism placed in parallel with contacts 19 and 20, and which opens automatically upon the completion of the cycle. This switch is actuated by the rotation of shaft 13, the details being clearly indicated in Figs. 1 and 5.

Thus this switch can include a pair of arcuate members 27 and 28 of conducting material formed to provide contact surfaces. They are shown as supported upon a stationary insulation member 29, contact posts 30 and 31 extending through said support and forming a convenient means for fastening these contact arcs 27 and 28 to member 29. The shaft 13 extends through the stationary support 29 and may be journalled therein. It carries a contact arm 57 which can be adjustably fastened to shaft 13 as by set screw 32. This contact arm is made from insulating material, and carries a contact piece 33 that can bridge contacts 27 and 28. This contact piece is urged resiliently against the members 27 and 28 as by compression spring 34 which is accommodated in a recess in the face of the arm 57. Guide pins 35 and 36 are attached to the contact piece 33, and are guided in appropriate apertures in the arm 57.

It is thus apparent that after the circuit is first completed between contacts 19 and 20, the contact piece 33 maintains the circuits in closed position even after the separation of the contacts 19 and 20. These contacts 27, 28 and 33 are kept in engagement for the whole cycle of operation of the mechanisms 11 and 12, but are finally disconnected by the movement of arm 57 onto an insulating segment 37 disposed in the path of contact member 33. In order to start a succeeding cycle, it is necessary to reinsert another price ticket such as 17, into the mechanism. The same cycle of operations is performed, the mechanisms 11 and 12 finally coming to rest when contact member 33 reaches the insulating segment 37.

When the circuits are finally deenergized at the completion of a cycle, the clutch coil 16 is also deenergized and motor 14 is disconnected from the shaft 13.

In Figs. 2, 3 and 4, I show one form that my auxiliary contact mechanism can take, which is operated in response to the insertion of the price ticket 17. It is to be understood, however, that this mechanism could be varied to suit the circumstances, and could be applied to other parts of the machine.

In this instance the contact pieces are shown as associated or supported on the rear of a stitcher head frame 38. This stitcher head frame as disclosed in my prior patents, forms one element of a mechanism for attaching or stapling the severed portion of the price ticket to a supporting backing. Attached to the back of the frame 38, a suitable bracket 39 is provided. This bracket can be attached to the frame 38 as by means of headed bolts 40 tapped into the frame 38, and passing through slots 41 in the bracket to permit vertical adjustment. The two legs of the bracket 39 are joined by a horizontal extension 42. A supporting block 43 of insulating material is fastened on the lower side of the horizontal member 42, and carries the contact post 44 at the end of which the contact 20 is formed. This contact post is adjustable in the member 43, as by being threaded therein. The lead or connection 45 is electrically connected thereto as by the nut 46.

The block 43 also serves to provide a guide for the movement of the movable contact supporting member 18. This member 18 is shown as extending across one side of the block 43. It has guide pins 47 and 48 extending through appropriate apertures in the block 43. It carries the movable contact 19, there being a metal contact strip 49 to which the connection can be made to lead the current to contact 19. Compression springs 50 and 51 tend to keep the contacts 19 and 20 apart, so that when the price ticket, such as 17 is removed, the contact opens. However, the mechanism is such that there is a limit to the opening movement, as by the aid of a member 52 fastened to the upper side of the horizontal member 42 and engaging in a transverse, flat bottom slot in the end of one of the pins 47, the freedom of motion of this pin being limited by the extent of the slot.

In the present instance, the stitcher heads also guide the movement of a vertically movable blade or punch 53 for severing the price ticket. This punch is arranged to proceed downwardly between the stationary cutters 54 and 55 (Fig. 4).

It is of course to be understood that a tape, such as 56, can be fed underneath the ticket 17, which after the severing operation is moved away from stitcher mechanism. That part of the tape 56 to which the severed portion of ticket 17 is attached is later cut off and deposited with its complete record in an appropriate receptacle, forming a part of the mechanism 11, all as clearly disclosed in my prior patent.

A résumé of the operation of my system can now be set forth. The person making the sale depresses the proper keys, such as the amount keys, kind of sale key, etc., all forming a part of the mechanisms indicated in Fig. 1 diagrammatically by reference characters 11 and 12. He will then insert the price tag or ticket 17 into the opening formed between the upper blade 53 and the lower stationary blade 54, 55. The pressure of the price ticket against the member 18 causes an engagement of contacts 19 and 20. This closes the motor circuit, as well as the clutch coil circuit. The arm 57 is then rotated away from the insulating segment 37, so as to keep the circuit closed even after the price ticket 17 progresses beyond the mechanism indicated in Figs. 2, 3, and 4. When the machine completes its cycle, the arm 57 will have rotated so far that the contact plate 33 will rest upon the insulating member 37. Thereupon the circuit is opened, the clutch released, and the motor 14 deenergized.

I claim:

1. In combination, a mechanism for performing an auditing operation on a price ticket, said mechanism having provisions to receive and retain at least a part of the ticket by the aid of a cycle of operations during which the retained material is moved away from the place where it is first received, means operated in response to the insertion of the price ticket into the mechanism for initiating the auditing operation thereof, and means ensuring that the mechanism completes one cycle only of the operations once said cycle is begun.

2. In combination, a mechanism for performing an auditing operation on a price ticket, said mechanism having provisions to receive and retain at least a part of the ticket by the aid of a cycle of operations during which the retained material is moved away from the place where it is first received, an electric motor for driving said mechanism, an electrically operated clutch for the motor, means operated in response to the insertion of the price ticket into the mechanism for energizing both the motor and the clutch, and means ensuring that both the motor and the clutch is kept operating so that the mechanism completes one cycle only of the auditing operations once said cycle is begun.

3. The combination as set forth in claim 2, in which the ensuring means is a control switch, operated by the motor and serving to complete the motor and clutch circuit as soon as the mechanism is started.

MATTHEW KLEIN.